(12) United States Patent
Rueb (10) Patent No.: US 11,345,014 B2
(45) Date of Patent: May 31, 2022

(54) METHOD OF DETECTING PROPER ORIENTATION OF MATERIAL APPLIQUE

(71) Applicant: Virtek Vision International ULC, Waterloo (CA)

(72) Inventor: Kurt D. Rueb, Kitchener (CA)

(73) Assignee: VIRTEK VISION INTERNATIONAL INC, Waterloo (CA)

( * ) Notice: Subject to any disclaimer, the term of this patent is extended or adjusted under 35 U.S.C. 154(b) by 177 days.

(21) Appl. No.: 16/791,248

(22) Filed: Feb. 14, 2020

(65) Prior Publication Data

US 2020/0262051 A1 Aug. 20, 2020

Related U.S. Application Data

(63) Continuation-in-part of application No. 16/536,771, filed on Aug. 9, 2019, now Pat. No. 11,010,574, and a continuation-in-part of application No. 16/376,463, filed on Apr. 5, 2019, now Pat. No. 11,022,554.

(60) Provisional application No. 62/806,296, filed on Feb. 15, 2019.

(51) Int. Cl.
*B25H 7/00* (2006.01)
*B44B 7/00* (2006.01)

(52) U.S. Cl.
CPC ............... *B25H 7/00* (2013.01); *B44B 7/002* (2013.01); *B44B 7/007* (2013.01)

(58) Field of Classification Search
CPC .......... G01N 21/6456; G01N 21/6428; G01N 2201/06113; G01N 2021/646; G01N 2021/6463; G01N 21/91; B25H 7/00; B44B 7/002; B44B 7/007; B29C 70/541; G01B 11/272; G01B 11/002
See application file for complete search history.

(56) References Cited

U.S. PATENT DOCUMENTS

| 4,983,817 | A | 1/1991 | Dolash et al. |
| 6,006,991 | A | 12/1999 | Faklis et al. |
| 6,407,810 | B1 | 6/2002 | Liu et al. |
| 6,597,439 | B1 | 7/2003 | Hakamata |
| 9,200,899 | B2 * | 12/2015 | Rueb .................. G06T 7/11 |
| 10,239,178 | B2 | 3/2019 | Rueb |
| 11,295,461 | B2 * | 4/2022 | Rueb .................. G06T 7/73 |
| 2005/0035205 | A1 | 2/2005 | Li |

(Continued)

*Primary Examiner* — Christine S. Kim
(74) *Attorney, Agent, or Firm* — Gregory D. DeGrazia; Miller, Canfield, Paddock & Stone PLC (57) ABSTRACT

A method of verifying placement of a piece on a work surface is disclosed. An imaging device and an illumination system are electronically interconnected with a computer. The illumination system projects indicia onto a work surface for indicating a location for placement of a piece on the work surface. An indicator is provided to the piece that includes light emission displaying fluorescent wavelengths when illuminated for distinguishing the piece form the work surface. The piece is placed upon the work surface at a location indicated by the laser indicia. The illumination system illuminates the piece presenting a visible contrast between the piece and the work surface enabling the imaging device to distinguish the piece from the work surface. The imaging device signals the controller a location of the piece for the controller to verify accurate placement of the piece.

17 Claims, 6 Drawing Sheets

(56) References Cited

U.S. PATENT DOCUMENTS

| | | |
|---|---|---|
| 2006/0108048 A1 | 5/2006 | Engelbart et al. |
| 2008/0289742 A1 | 11/2008 | Engelbart et al. |
| 2009/0323058 A1 | 12/2009 | Dyba |
| 2011/0114729 A1 | 5/2011 | Moon et al. |
| 2012/0318860 A1 | 12/2012 | Anderson et al. |
| 2016/0084769 A1 | 3/2016 | Chang et al. |
| 2017/0122871 A1 | 5/2017 | Meer |
| 2017/0348958 A1 | 12/2017 | Van Voast et al. |
| 2018/0000011 A1 | 1/2018 | Schleusner et al. |
| 2018/0109770 A1* | 4/2018 | Rueb .................. G02B 26/0825 |
| 2018/0270474 A1 | 9/2018 | Liu |
| 2020/0167905 A1* | 5/2020 | Bian .................. G01N 21/8851 |
| 2020/0226770 A1* | 7/2020 | Rueb .................. H04N 9/317 |

\* cited by examiner

_Fig-8B_

_Fig-9_

METHOD OF DETECTING PROPER ORIENTATION OF MATERIAL APPLIQUE

PRIOR APPLICATIONS

The present application claims priority to U.S. Provisional Patent Application No. 62/806,296, filed on Feb. 15, 2019, to U.S. patent application Ser. No. 16/376,463, filed on Apr. 5, 2019 that claims priority to U.S. Provisional Patent Application No. 62/653,890, filed on Apr. 6, 2018, and to U.S. patent application Ser. No. 16/536,771 filed on Aug. 9, 2019 that claims priority to U.S. Provisional Patent Application No. 62/717,431 filed on Aug. 10, 2018 the contents each of which are incorporated herein by reference in their entirety.

TECHNICAL FIELD

The present application relates generally toward an improved method for verifying proper orientation and position of an applique on a work surface. More specifically, the present application relates to a method of incorporating an indicator that includes fluorescent properties into the applique providing an improved method of identifying an orientation of the applique on the work surface.

BACKGROUND

During certain manufacturing processes a need exists to verify proper placement of a piece, applique, or a component on a work surface. In some processes, the work surface may be a mandrel onto which a layered assembly takes place. Alternatively, the work surface may be a component of an assembly onto which additional pieces are placed or mated. In this example physical indicia, such as, for example, masking, may be placed on the work surface of the component to locate where the piece is to be placed, or where additional work, such as, for example precision painting is to be performed on the component.

Vast improvements in manufacturing efficiency have been achieved by projecting a laser indicia or template 113 onto a work surface. The projections provide an operator a precise location where a piece, masking, or applique is to be placed or where additional work is to be performed. As used herein, piece, masking and applique are interchangeable and intended to include those items affixed in some manner to a work surface. Further improvements to these projections have been achieved through combined use of photogrammetry and laser projection to accurately projection the indicia or template 113. One such example is disclosed in U.S. Pat. No. 9,200,899, the contents of which are incorporated herein by reference in its entirety. However, additional validation of the accuracy of placement is often necessary to verify the operator has adequately located the piece or applique. Operator verification is time consuming and prone to human error. Machine vision verification has proven ineffective, particularly when a layering assembly process is performed. The lack of contrast between layers has proven too difficult for presently available imaging device to distinguish one layer from the next. Further attempts to use laser projectors to verify placement has proved elusive due to the laser speckle that may blur imaging quality, particularly at long distances.

Therefore, a need exists to improve the ability of machine based verification of accurate placement of a piece, component or indicia.

SUMMARY

A method of verifying placement of a piece on a work surface is disclosed. As used herein, piece includes a ply, component, and physical masking or indicia. A controller is programmed with computer aided design (herein after, "CAD") data with assembly sequence and location. The controller is electronically linked to an imaging device and an illumination system. The illumination system includes either, or both a laser projector and light emitting diode (LED) and equivalents. The illumination system or laser projector projects indicia onto a work surface for indicating a location for placement of a piece on the work surface. An indicator is applied to the piece including light emission displaying fluorescent wavelengths when illuminated. The piece is placed on the work surface at a location indicated by the laser indicia. The illumination system illuminates the piece to present a visible contrast between the piece and the work surface enabling the imaging device to distinguish the piece from the work surface. The imaging device signals the controller a location of the piece for the controller to verify accurate placement of the piece by comparing placement of the piece to the CAD data.

The indicator enables the imaging device to distinguish and edge 31 and configuration of the piece from the background surface or work surface. The fluorescence of the indicator is detected at a high degree of accuracy due to the contrast between the fluorescence of the indicator and the background surface. The imaging device signals the controller, with precision, the edge 31 shape of the piece so that the controller may make comparisons with the CAD data. The rapid and highly accurate comparison eliminates the need for an operator attempting to visually validate accurate placement of the piece on the work surface.

BRIEF DESCRIPTION OF THE FIGURES

Other advantages of the present invention will be readily appreciated as the same becomes better understood by reference to the following detailed description, when considered in connection with the accompanying drawing, wherein.

DETAILED DESCRIPTION

Figure 1:
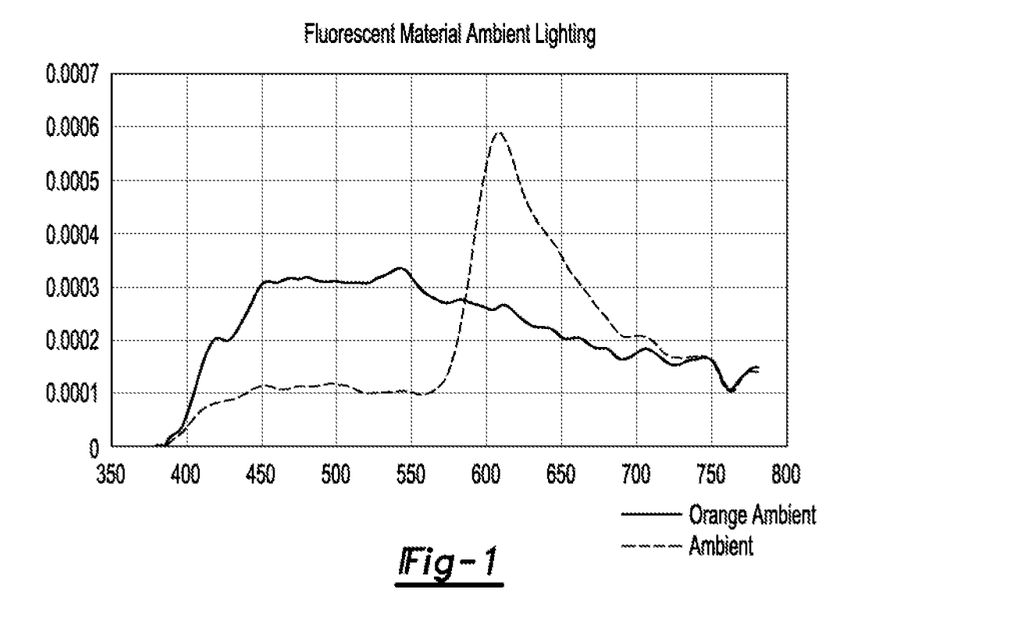
FIG. 1 shows a composition of ambient light contrasted with reflected and emitted light from the fluorescent material.

The invention of the present application overcomes existing methods of validating accurate assembly by exciting fluorescent die, or an equivalent that has been added to an assembly component, such as, by way of non-limiting example, plies, masking tape, mechanical indicia, and the like. Unlike traditionally colored materials that absorb certain portions of ambient light, fluorescent materials absorb incidental light and emit incidental radiation at a wavelength that differs from the wavelength of the illuminating light. For example, as best represented in FIG. 1, orange fluorescent material absorbs ambient light at wavelengths below about 575 nm and re-emits fluorescence at longer wavelengths with peak fluorescence at about 606 nm. The peak fluorescence at 606 nm provides the ability to better distinguish fluorescent objects from non-fluorescent objects.

Figure 2:
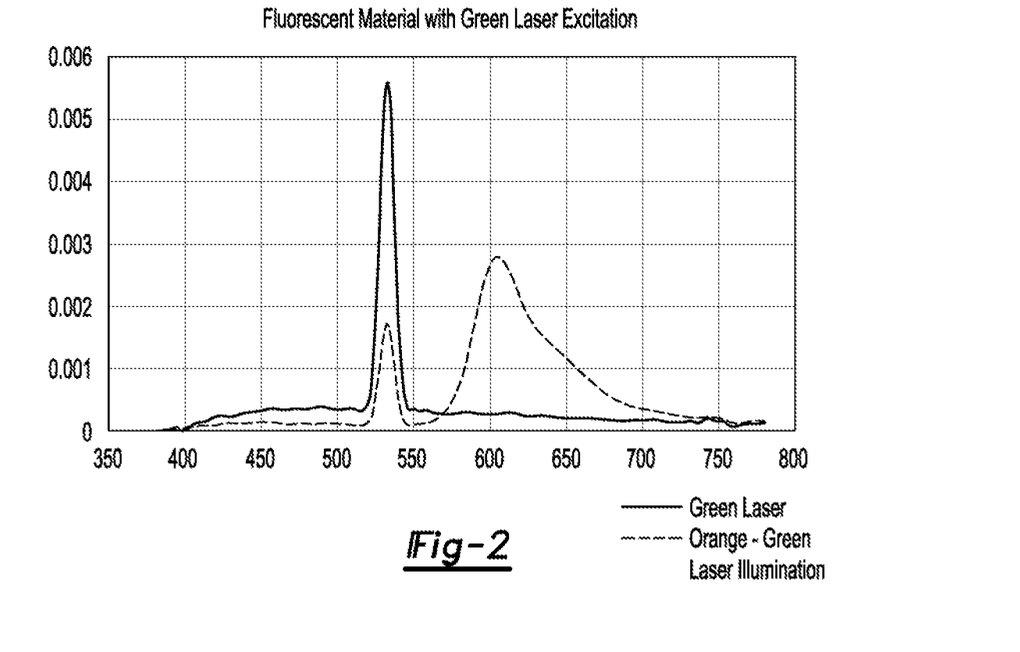
FIG. 2 shows a comparison of illumination of fluorescent material comparing illumination composition of ambient light with added laser illumination to reflected and emitted light from the fluorescent material.

Additional distinguishing benefits are achieved when the fluorescent material is illuminated by an illumination source having a wavelength outside the fluorescent wavelength band. For example, illuminating fluorescent material such as, for example, orange fluorescent material with a laser or other light source projecting in the green spectrum or light emitting diode (LED) illuminating in a non-orange spectrum provides substantive benefits. Illumination of fluorescent material using an illumination source generating light outside the fluorescent band of the fluorescent material provides the ability to separate the illuminating light from the fluorescence of the fluorescent material. As represented in FIG. 2, a green laser (or green LED source) used to illuminate orange fluorescent material provides an emission response that is clearly differentiated. The green laser provides peak value at about 535 nm while the orange fluorescence, when illuminated with a green source peaks at about 606 nm. A fluorescence peak at 606 nm provides favorable distinguishing characteristics enabling improved sensor detection of, for example, and edge 31 of a piece of ply or tape by distinguishing the light reflected from non-fluorescent materials from the fluorescence of the ply or tape.

Figure 3:
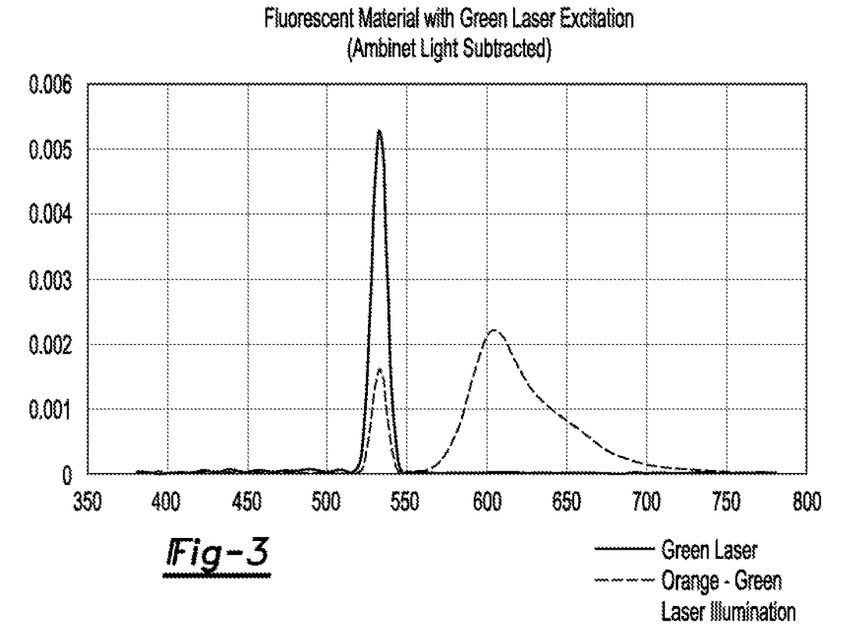
FIG. 3 shows a comparison of illumination of fluorescent material having a contribution of ambient light illumination removed; a FIG. 4 shows a first embodiment of an illumination system.

Further accuracy in detecting contamination is achieved by filtering ambient illumination. When discounting ambient illumination, the fluorescence of the fluorescent material becomes even more pronounced. In this manner, even very small pieces or particles of contamination treated with the fluorescent die can be reliably detected. As best represented FIG. 3, removal of the ambient light provides a substantially more clear separation between the excitation light source (green laser or LED) and the corresponding responsive fluorescence than previously thought possible. Therefore, machine validation of the accuracy of an assembly process may now provide rapid analysis of the accuracy of a placement of ply, piece, tape or equivalent establishing accurate results.

Figure 4:
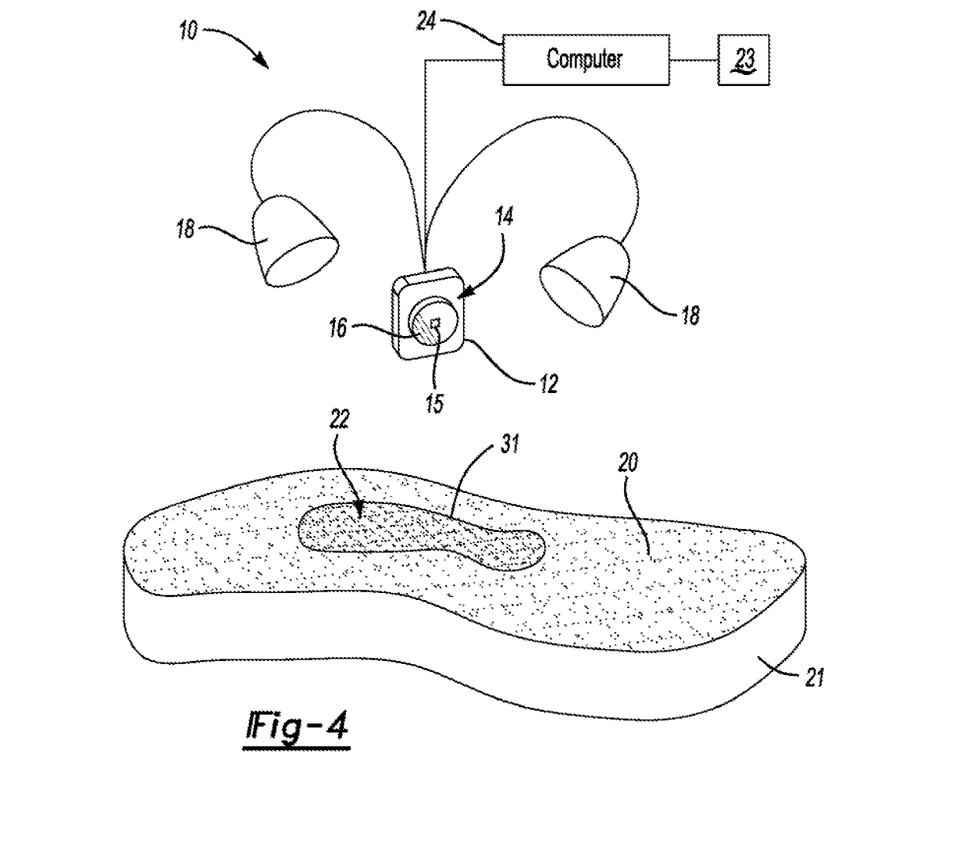

Referring now to FIG. 4, a first embodiment of the detection assembly of the present invention is generally shown at 10. The assembly 10 includes a camera 12 with a lens 14 and a shutter 16. A light sensor 15 is included in the camera 12. In one embodiment, the sensor 15 is a CMOS sensor. In an alternative embodiment the sensor 15 is a CCD sensor. Other types of sensors 15 are also within the scope of this invention. An illumination system 18 illuminates a work surface 20 of a workpiece 21. In one embodiment, the work surface 20 is a composite ply of a layup. In alternative embodiments, the workpiece is any device that includes the need for accurate placement of a piece, masking, ply, and the like, all of which are identified by element number 22 throughout the specification of the present application. Multiple illumination sources may be used to excite the fluorescent material.

In one embodiment a laser projector 112 (FIG. 5) functions to illuminate the piece 22 with a different excitation wavelength than the emission wavelength of the fluorescent dye used to mark the piece 22. While a laser based illumination system 18 is discussed in further detail herein below, it should be understood that the invention of the present application include alternative sources of illumination including, but not limited to LED illumination, and even combinations of illumination sources. Validation accuracy of the placement improves significantly when illumination by the illumination system 18 is outside the wavelength of the fluorescent spectrum.

The illumination source 18 is electronically linked via computer 24, or directly to the camera 12. The camera lens 14, shutter 16, and image capture are synchronized with the illumination system 18 to interleave capture of images. Interleaved image capture of images with and without excitation of the fluorescent material 22 by the illumination system allows the computer 24 to subtract any excitation of the fluorescent material 22 by ambient light. This provides for the isolation of the excitation of the fluorescent material 22 by the illumination system 18. In one embodiment, interleaving is conducted at a rate that is imperceptible to an operator. Therefore, the image capture occurs at the same rate as an illumination pulse or flash by the illumination source 18, in this embodiment, is contemplated to be a light emitting diode (LED) flash or pulse. Further, multiple emission signals (fluorescence) from multiple image captures are averaged to improve the sensitivity and reliability of contamination detection.

In one embodiment, the camera 12 includes a "rolling" shutter 16 having an illumination strobe rate that is a fraction of an image capture rate by the sensor 15 to produce illumination bands within the captured image. By using a reduced duty cycle for the strobe illumination by the illumination system 18, the power of the strobe illumination is much greater than the brightness of the illumination perceived by the operator. Therefore, when the illumination occurs at a much higher rate than the entire image capture, the illumination occurs in "bands" when the imaging strobe flash is activated. During the instant the strobe occurs, the illumination is substantial when compared to ambient illumination, only the average illumination power is imaged so that the illumination does not appear excessively bright. This phenomenon is particularly true when the illumination bands include only one half or one quarter of the total image capture period. This strategy improves operator viewing comfort without any reduction in detection sensitivity by the sensor 15 and camera 12.

As set forth above, it is desirable to isolate fluorescent emissions upon illumination. To assist isolation, an additional embodiment provides a monochromatic camera (or plurality of cameras) is included using optical filters to isolate the wavelength of the excitation energy from the emitted fluorescence from the fluorescent material in the chosen fluorescent emission wavelength. In an alternative embodiment, selecting compatible wavelengths provide the ability to use a filter grid of a standard color camera to separate the fluorescent wavelengths from the illumination (excitation) wavelengths. For example, a green laser (or LED) generating excitation light having a wavelength of 520 nm is easily filterable from orange fluorescent emission having a wavelength of 606 nm.

Figure 5:
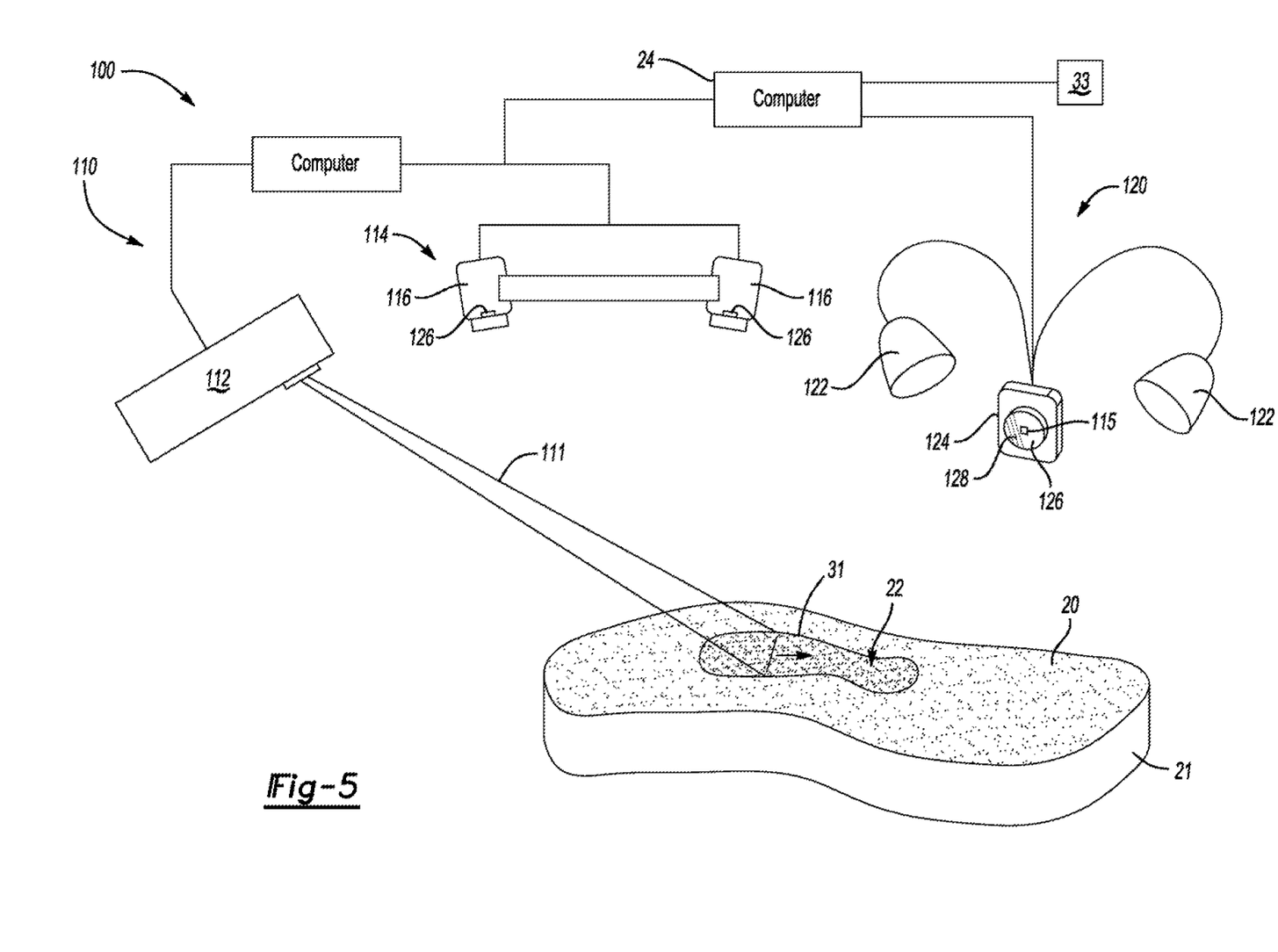
FIG. 5 shows a second embodiment of an illumination system and a laser projector and photogrammetry system.

A further alternate embodiment is shown in FIG. 5 generally at 100. The alternate embodiment 100 integrates an optical layup laser projection system 110 operating in a similar manner to the system disclosed in U.S. Pat. No. 9,200,899, the contents of which are included herein by reference in entirety. The projection system 110 includes a laser projector 112 and a photogrammetry assembly 114. The optical layup system 110 projects laser templates 113 upon an assembly tool or workpiece 21 as is disclosed in U.S. Pat. No. 10,052,734, the contents of which are also included herein by reference in entirety to provide an operator a location at which each sequential piece of ply 22 is to be placed. As is disclosed in the U.S. Pat. No. 9,200,899, the photogrammetry assembly 114 locates the assembly tool or workpiece and signals the computer 24 where to project the laser template 113 based upon computer aided design (CAD) models. The photogrammetry assembly 114, in this embodiment, includes one or more photogrammetry cameras 116 that can also detect fluorescence when contamination is illuminated. However, it should also be understood that the optical layup system 110 may also be separate from the illumination system relying on separate cameras 116. In this embodiment, the photogrammetry assembly 114 communicates with the laser projector 112 via computer 24 to coordinate laser illumination with shutter 118 speed, image capture, etc.

As set forth above, one embodiment of the present invention includes application of a ply onto a layered composite workpiece 21. As identified in FIG. 7, the piece 22 includes a cover paper 23 and a backing material 25. The operator first places the piece 22 with backing material 25 facing the imaging system 124. The imaging system 124 then guides the laser 112 to scan a bar code disposed upon the backing material 25 and the imaging system 124 detects the barcode and signals the computer 24 to verify the correct piece 22 has been selected. The operator then removes backing material 25. When desired, the detection system then verifies that all backing material has been removed. The removal of the backing material 25 can then be recorded in the process log of the optical template 113 system, ensuring that no pieces 22 are placed with the backing material 25 still intact (although extreme, such errors can occur if an operator becomes distracted while completing a trial placement of the part with the backing material still attached).

Figures 7, 8A:
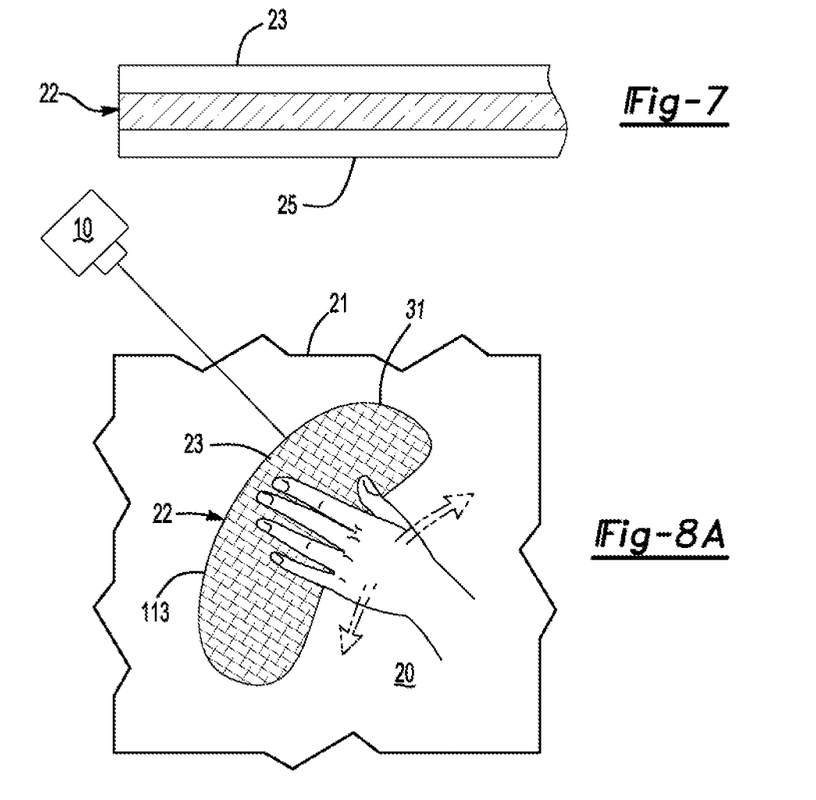
FIG. 7 shows a cross-sectional view of a piece of ply having backing paper and cover paper.
FIG. 8A shows an application process of a piece of ply with cover paper being directed by a laser template.

Once the backing paper is removed, the piece of ply 22 is overlaid onto the work surface 20 by the operator smoothing the ply 22 onto the work surface 20 as shown in FIG. 8A. The location the ply 22 is adhered to the work surface 20 is identified by the projector 112 by projection of a laser template 113. While smoothing, the cover paper 23, including the indicator, is left intact. Once placed, the operator signals the computer 24 to initiate location validation of the ply 22. Once initiated, the computer 24 signals either the illumination system 18, 122 or the laser projector 112 illuminates the work surface 20 and the ply 22, and the imaging device 14, 114 generates an image, and more specifically, clearly delineates the ply 22 from the background work surface. The edge 31 of the ply 22 due to the fluorescence of the indicator is clearly defined in the image. Therefore, the computer 24 can now compare the detected edge 31 with CAD data to verify accurate placement of the ply 22. The disposition, either accurate placement or inaccurate placement is then signaled to the operator via a terminal, smart device 33 or even projected laser indicia that the ply has been inaccurately placed.

Figure 8B:
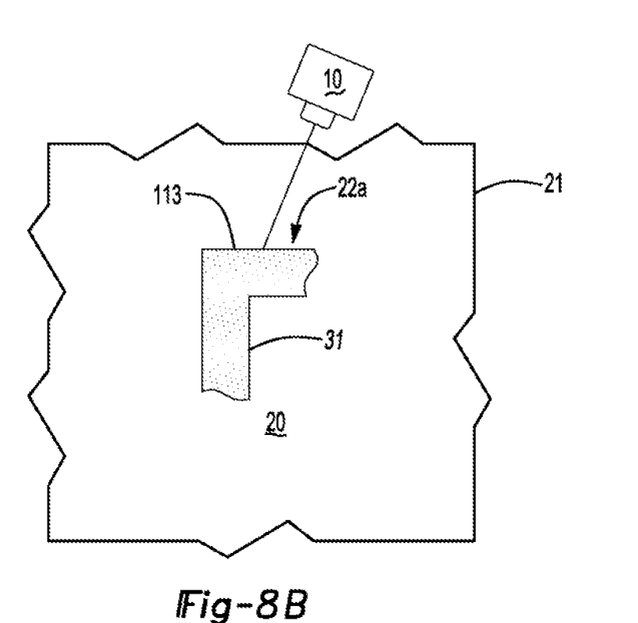
FIG. 8B shows an application process of a masking being directed by a laser template.

FIG. 8B shows an alternative embodiment in which the operator adheres a masking 22a, for example, masking tape for a paint operation. The laser projector 112 projects a laser template 113 onto a work surface; in one embodiment an airplane fuselage or other object requiring high precision, decorative painting. The operator applies the masking 22a, including the indicator, at the location indicated by the template. Once applied, the operator signals the computer 24 to initiate validation of masking 22a placement by comparing the detected edge 31 of the masking with CAD data of the design location of the masking 22a as set forth above. Once the location has been verified in a manner explained above, the operator initiates processing, such as, for example, applying paint or other coating to the work surface 20. Once the paint or other coating is applied, the masking 22a is removed in a known manner.

Referring again to FIG. 5, the laser projector 112 cooperates with photogrammetry assembly 114 and the detection assembly 120. The detection assembly 120 includes a secondary illumination system 122 that either illuminates the ply 20 simultaneously with the laser projector 112, intermittently with the laser projector 112, or before and after illumination with the laser projector 112.

Still further, the detection system 120 includes a secondary camera 124 in like manner as set forth above. The secondary camera 124 either signals the computer 24 a preliminary location of the piece 22 or detects an exact location of the piece 22 by detecting fluorescence generated by the laser projector 112, the secondary illuminator 122, or combinations thereof. In this manner the secondary camera 122 includes a lens 126 and a shutter 128 that is coordinated with illumination in a similar manner as set forth above to selectively allow light to reach a sensor 115. While the shutter 128 is represented as a mechanical shutter merely for exemplary purposes, it should be understood that the shutter 128 may also be an electronic shutter capable of rapid discrimination of light transmission to the sensor 115 commensurate the rate of flash or pulse from the illumination source.

Figure 6A:
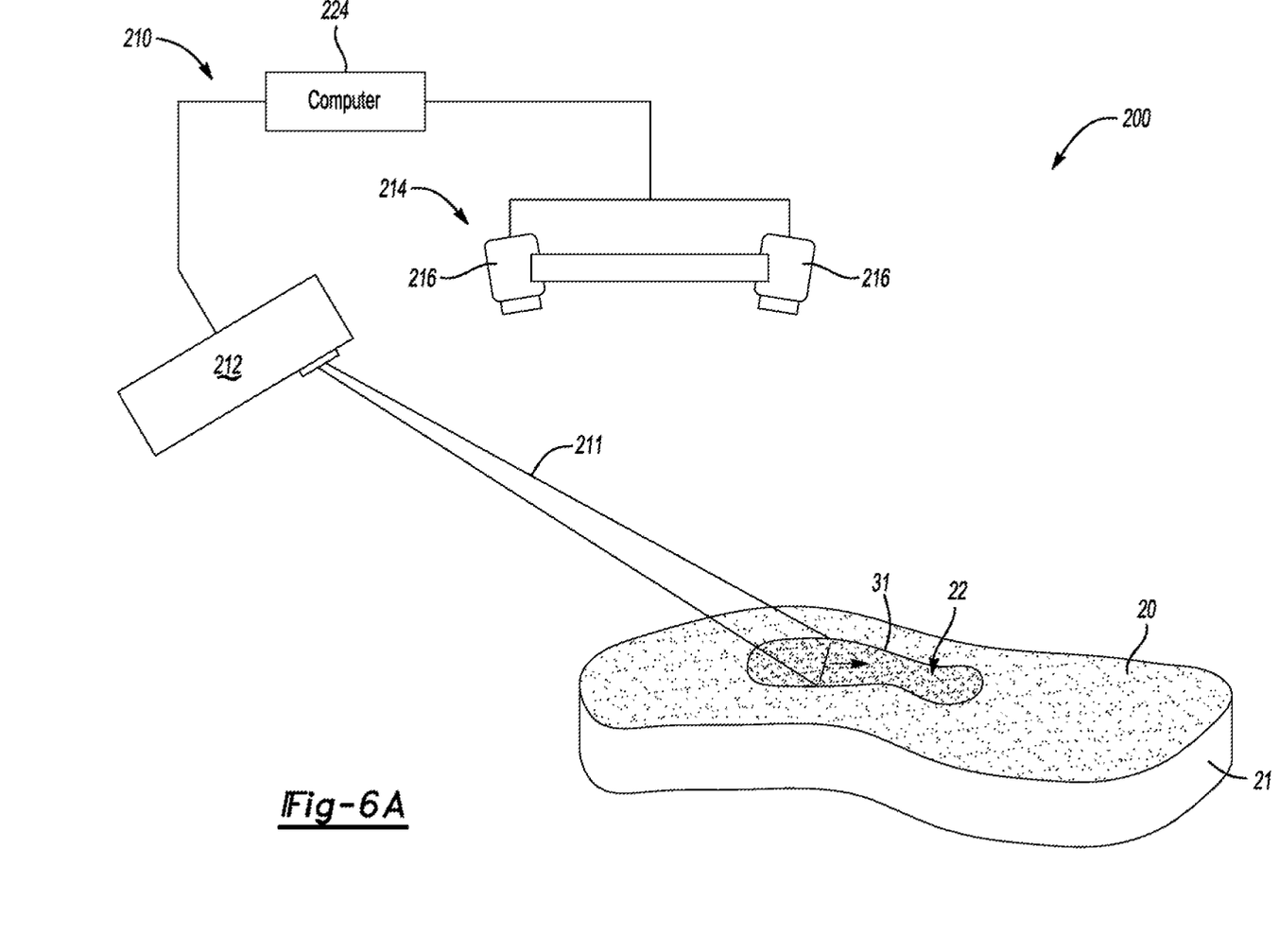
FIG. 6A shows a third embodiment with a laser projector and photogrammetry system.

A still further embodiment of the invention of the present application is generally shown at 200 in FIG. 6A. The second alternate embodiment 200 relies solely on an optical layup laser projection system 210 similar to the system disclosed in U.S. Pat. No. 9,200,899. The projection system 210 includes a laser projector 212 and a photogrammetry assembly 214. As set forth above, the optical layup system 210 projects laser templates upon an assembly tool or work surface 20 to provide an operator a location at which each sequential piece of ply 22 is to be placed. The photogrammetry assembly 214 locates the assembly tool or workpiece and signals the computer 224 where to project the laser template based upon computer aided design (CAD) models. The photogrammetry assembly 214 includes one or more photogrammetry cameras 216 and sensors 226 that also detect fluorescence when the ply 22 or mask 23 is illuminated. Still further, the alternate embodiment 220 may be part of single system similar to that disclosed in U.S. Pat. No. 10,239,178, the contents of which are also included herein by reference in entirety.

In this embodiment, the laser projector 212 projects a green laser beam 211 toward a location of the ply as set forth above. In one embodiment, the laser beam 211 includes a line shaped focus to cover more surface area upon each pass of the scan. As also set forth above, excitation of the fluorescent material by the green laser beam 211 enables the cameras 216 of the photogrammetry assembly 214 to distinguish the fluorescence of the ply 22 from any reflectance from the work surface 20. In addition, the photogrammetry assembly 214 identifies a location of the ply 22 or mask 23 through triangulation of the fluorescence in a manner similar to identifying a location of a retro-reflector (not shown) explained further in U.S. Pat. No. 9,200,899.

Figure 6B:
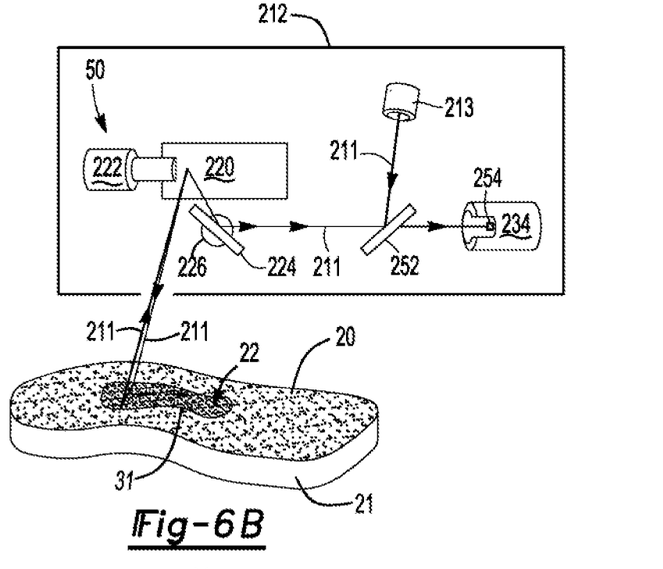
FIG. 6B shows a fourth embodiment including a laser sensor adapted for sensing fluorescence.

In a further embodiment represented in FIG. 6B, a photogrammetry system is not relied on to distinguish fluorescence. In this embodiment, inner workings of the laser projector 212 are explained wherein a laser sensor 254 is included as part of an alternate imaging device 234. A laser source 213 is disposed within the laser projector for generating the laser beam 211. The computer 224 (See FIG. 6A) directs a first scanning motor 222 and a second scanning motor 226 to direct orientation of a first scanning mirror 220 and a second scanning mirror 224, respectively. A dichroic mirror 252 is located between the scanning mirrors 220, 224 and the laser source 213 to reflect the laser beam toward the mirrors 220, 224. In this embodiment, the fluorescent emissions from the ply 22 (or masking 22a) are sensed by the alternate imaging device 234 as returned along a same path as the laser beam 211.

In this embodiment, the laser source 213 transmits a green laser beam 211 having a peak of about 532 nm onto the dichroic mirror 252 to the first scanning mirror 224 and the second scanning mirror 220 to scan the area on the work surface 220 onto which the ply 22 (or masking 22a) has been placed for the purpose of exciting the fluorescent material disposed in the ply 22 (masking 22a). Returned light emitted from the fluorescent material is redirected by the first and second scanning mirrors 220, 224 to the dichroic mirror 252 that transmits only light that peaks at the fluorescent wavelength of about 608 nm to the sensor 254. The sensor 254, in this embodiment, includes collection optics and sensor electronics, such as, for example, photodiodes, photomultipliers, and equivalents to provide necessary detection sensitivity. Therefore, any light reflected from non-fluorescent materials does not reach the sensor 254 allowing the sensor 254 to signal the computer 224 the precise location of the ply 22 (or masking 22a). While the use of photogrammetry is quite suitable, this alternative embodiment is believe to provide more rapid results because the whole image capture is not necessary due to the scanning mirrors 220, 224 tracking movement of the laser beam 211. With the use of the sensor 254, it is not always necessary to triangulate the position of the ply 22. The position of the template has already been determined in the three dimensional coordinate system and compared to the CAD model. Therefore, the computer 224 can relate the laser scanned position to the correct position on the work surface 20. It should also be understood that once the laser has scanned the work surface 20 and the ply 22, whether fluorescence is detected by the sensor 254 or cameras 14, 114, 214 it is not always necessary to rely on triangulation to accurately validate placement of the ply 22 or masking 22a.

An additional feature of the invention of the present application is the verification of proper alignment of fibers disposed in a ply 22 that has been adhered to the work surface 20. In certain applications, each piece of ply 22 includes ply fibers 27 oriented to provide necessary strength to a workpiece. As shown in FIG. 5, layers of ply 22 may require crosswise fiber orientation for desired distribution of strain anticipated in a given workpiece, such as, for example, a wing of a passenger plane.

Figure 9:
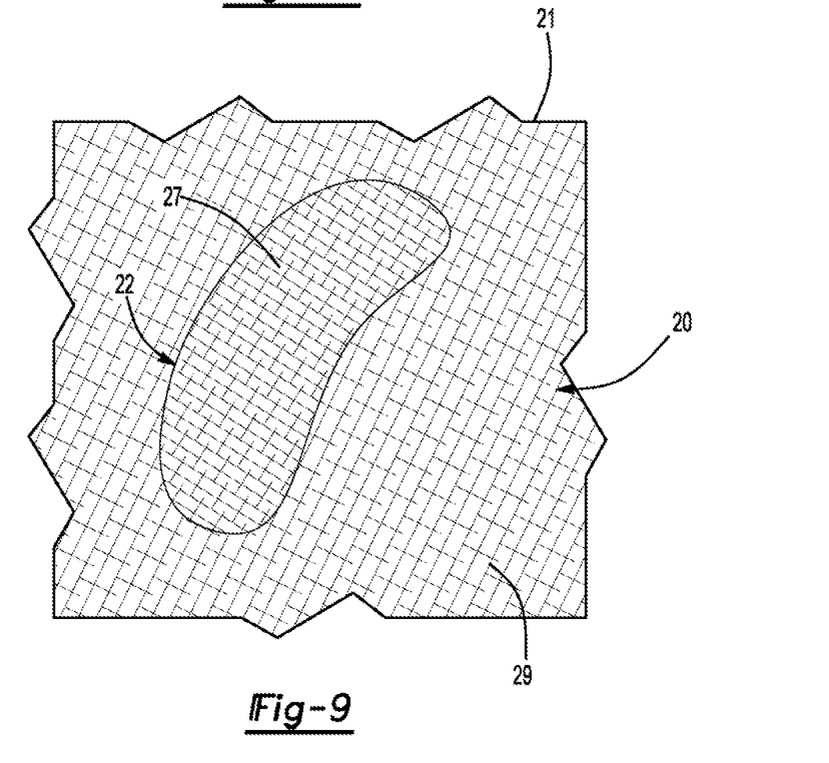
FIG. 9 shows an applied applique with oriented fibers.

FIG. 9 shows a piece of the ply 22 in position on a work surface 22 workpiece 21. The ply 22 includes ply fibers 27 oriented crosswise of workpiece fibers 29. As set forth above, the ply 22 is a polymer material impregnated with ply fibers 27 for added strength. As layers of the ply 22 are applied to the workpiece 5, it becomes nearly impossible to determine if the ply fibers 27 are properly aligned according to design criteria because the same material is applied in multiple layers until a desired thickness is achieved.

In a typical manufacturing scheme, the piece of ply 22 is pre-cut in a desired design configuration so that the fibers 6 are oriented in the desired manner. As set forth above, the backing paper 25 is removed from the ply 22 prior to application to the workpiece work surface 20. It should be understood that the material forming the ply 22 is a polymer that may be tacky prior to curing. A kit of multiple pieces of ply 22 are provided to an assembly facility and the backing paper 25 prevents the individual pieces of ply 22 from adhering together prior to assembly.

Once the backing paper 25 has been scanned to detect the barcode or other identifying indicia, the backing paper 25 is removed and the piece of ply 22 is overlaid onto the workpiece work surface 20 in a location indicated by the projected template 113 as shown in FIGS. 8a and 8b. An operator smooths the piece of ply 22 onto the surface of the work surface 20 by rubbing the cover paper 23 until the ply 22 is sufficiently adhered to the work surface 20 or prior layer of ply. Scanning the barcode or other identifying indicia is particularly useful when the piece of ply 22 (or masking 22a) being applied is symmetric with other pieces. Any ambiguity is resolved by scanning the barcode or other identifying indicia prior to application further reducing a propensity for error.

The cover paper 23 is subject to a die that fluoresces when illuminated by way of a laser or illumination system 122 shown in FIG. 5. As set forth above, scanning the paper cover 23 that has been treated with the indicia or fluorescent die eliminates or substantially decreases laser speckle known to obscure precise measurement of the orientation and location of the applique.

Prior to removing the cover paper 23 (after application) a laser projector 10 (or illumination device 122) scans the piece of ply 22 causing the die to fluoresce. In one embodiment, the laser projector 112 scans a line beam across the work surface 20 over the area onto which the piece of ply 22 has been adhered. A sensor included with the laser projector 10 detects the location of the fluorescence and a computer 24 determines the orientation and configuration of the cover paper 24, based in part on the detection of the edge 31 of the cover paper 24 that is clearly delineated from the work surface 20 due to the fluorescence of the indicator. The fibers 27 are oriented during production of the appliques and are unique to a contour of each of the pieces of ply 22. If the orientation and configuration of the cover paper 24 is determined to be correct the computer 24 identifies the fibers 27 to be properly aligned. Not only is the computer 24 able to determine proper fiber 27 alignment, it also determines if the applique has been located properly by way of the improved contrast between the cover paper 24 and the prior layers of ply. By detecting fluorescence and filtering the illuminating light, laser speckle known to blur imaging is eliminated enabling the computer 24 to precisely distinguish the edge 31 of the cover paper 23 from the prior layers of ply. Thus, the exact contour and orientation of the cover paper 23 can now be accurately verified. Autoclave or other curing method may be used to sufficiently cure the layers of ply 22 once assembly is complete, or after each layer is adhered.

An alternative embodiment, an imaging device 114, such as, for example, the multi-camera photo grammetry system explained above is also used to detect the orientation and configuration of the cover paper 23. In this embodiment, either the laser projector 10 or the illumination system 122 is used to cause the cover paper to fluoresce.

After proper orientation of the fibers 27 is determined, the cover paper 23 is removed from the piece of ply 22 and the assembly or curing process continues. The laser projector 112 and/or the illumination system 122, optionally again illuminate the area proximate the location of application of the piece of ply 22 to determine if contamination from either the cover paper 23 or the backing paper 25 remains in the piece of ply 22. In one embodiment, the backing paper 25 includes a different fluorescent indicator than the cover paper 23, enabling an operator or the imaging system 124 to determine if the contamination is on the exposed surface of the piece of ply 22, beneath, or embedded in the piece of ply 22.

The invention has been described in an illustrative manner, and it is to be understood that the terminology that has been used is intended to be in the nature of words of description rather than of limitation. Obviously, many modifications and variations of the present invention are possible in light of the above teachings. It is therefore to be understood that within the specification, the reference numerals are merely for convenience, and are not to be in any way limiting, and that the invention may be practiced otherwise than is specifically described. Therefore, the invention can be practiced otherwise than is specifically described within the scope of the intended claims.

What is claimed is:

1. A method of verifying placement of a piece on a work surface, comprising the steps of:
providing a controller;
providing an imaging device and an illumination system;
said illumination system projecting indicia onto a work surface for indicating a location for placement of a piece on the work surface;
providing an indicator to the piece including light emission displaying fluorescent wavelengths when illuminated thereby distinguishing the piece from the work surface;
placing the piece on the work surface at a location indicated by the indicia;
said illumination system illuminating the piece thereby presenting a visible contrast between the piece and the work surface enabling said imaging device to distinguish the piece from the work surface; and
said imaging device signaling said controller a location of the piece for said controller to verify accurate placement of the piece.

2. The method set forth in claim 1, wherein said step of providing said illumination system is further defined by providing a laser projector and a secondary light source.

3. The method set forth in claim 2, wherein said step of providing said secondary light source is further defined by providing a light emitting diode.

4. The method set forth in claim 2, wherein said step of said illumination system projecting indicia onto the work surface is further defined by said laser projector generating a laser beam for scanning the indicia onto the work surface.

5. The method set forth in claim 2, further including a step of said laser projector scanning an edge of a cover paper applied to the piece with a laser beam thereby causing the edge of the cover paper to fluoresce for distinguishing the edge of the cover paper from the work surface.

6. The method set forth in claim 2, further including a step of said laser projector scanning an edge of the piece with a laser beam thereby causing the edge of the piece to fluoresce for distinguishing the edge of the piece from the work surface.

7. The method set forth in claim 1, wherein said step of providing said imaging device is further defined by providing a monochromatic camera.

8. The method set forth in claim 1, wherein said step of said illumination system illuminating the piece is further defined by one of a laser projector and a secondary light source illuminating the piece.

9. The method set forth in claim 1, further including a step of filtering light detected by the imaging device being outside the fluorescent wavelengths of the indicator.

10. The method set forth in claim 1, including a step of applying a marking to the piece being identifiable by said imaging device for signaling said controller an identity of the piece.

11. The method set forth in claim 1, further including a step of said controller interleaving image capture with and without excitation of the fluorescent wavelengths of the indicator thereby enabling said controller to subtract excitation of the fluorescent wavelengths of the indicator by ambient light.

12. The method set forth in claim 1, wherein said step of placing the piece is further defined by placing one of a ply, a mask, or workpiece onto the surface.

13. The method set forth in claim 12, further including a step of said controller verifying orientation of fibers disposed in the ply from an image of the ply generated by said imaging device.

14. The method set forth in claim 13, wherein said step of said controller verifying orientation of fibers disposed in the ply is further defined by said controller comparing orientation of the ply placed on the work surface with Computer Aided Design orientation of the ply.

15. The method set forth in claim 12, wherein said step of providing an indicator to the piece is further defined by providing cover paper to the ply and applying the indicator to the cover paper.

16. The method set forth in claim 1, wherein said step of providing an imaging device is further defined by providing an optical sensor comprising photodiodes, photomultipliers, and equivalents for sensing fluorescence.

17. The method set forth in claim 1, further including a step of filtering reflection of light outside a fluorescence wavelength of the indicator.

* * * * *